Dec. 3, 1940.  E. RÜDIGER  2,223,921

ERASER

Filed Oct. 18, 1939

Inventor,
E. Rüdiger
by: Glascock Downing & Seibold
Attys.

Patented Dec. 3, 1940

2,223,921

UNITED STATES PATENT OFFICE 2,223,921

ERASER

Ernst Rüdiger, Berlin, Germany

Application October 18, 1939, Serial No. 300,047
In Germany July 30, 1938

10 Claims. (Cl. 120—36)

My inventions relates to erasers, and more especially to erasers of the type in which a thin strip of rubber is employed for effecting erasions on restricted areas.

It has already been proposed to provide an eraser comprising a hollow handle in which the rubber strip is inserted. In this known eraser, the length of the strip is equal to that of the handle, that is, the rubber strip is straight. Here, the material and manufacturing cost of the handle is higher than that of the strip in the handle. The comparatively short strip soon becomes exhausted and must be replaced. However, standardized strips are often not kept in stock, and so it may be difficult, or even impossible, to procure substitute rubber strips, and the comparatively expensive holder becomes useless when its supply of rubber strip has become exhausted.

It is an object of my invention to provide an eraser in which the aforesaid drawbacks are eliminated.

To this end, I provide a handle, or hollow holder, and in this I insert a rubber strip, preferably of square section, whose length is a multiple of the largest inside dimension of the handle. By these means, a comparatively large supply of rubber strip is stored by folding the rubber strip spirally or zig-zag fashion before it is inserted in the handle, and this lasts for a much longer period than the strip in the aforesaid known holder whose length is only equal to that of the holder. In addition, I make the handle of comparatively inexpensive material, for instance, card board, impregnated paper, celluloid, or the like, in short, of a material whose cost is much less than that of the rubber strip which is housed in the handle, so that the loss involved by the handle becoming useless after its supply of rubber strip has become exhausted, is negligible.

In the accompanying drawing, three erasers embodying my invention are illustrated by way of example.

In the drawing—

Figure 1:
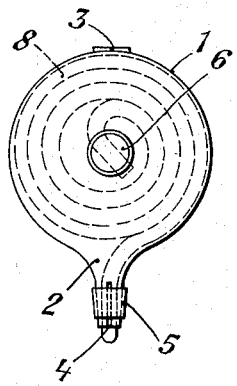
Fig. 1 is a side elevation.
Figure 2:
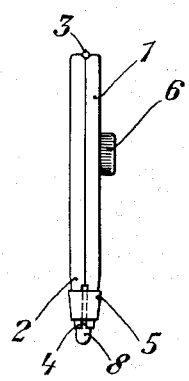
Fig. 2 is an end elevation, viewed from the left in Fig. 1, of an eraser whose rubber strip is wound spiral fashion in the handle, the strip being fed by a knurled hand wheel engaging its inner end.

Referring now to the drawing, and first to Figs. 1 and 2, the holder I comprises a pair of cup-shaped members connected by a hinge 3 at one side and having an extension 2 at the opposite side, with a restricted tubular end. A strip of rubber 8 which may be of any desired cross-section but is preferably square, and whose length is a multiple of the largest inside dimension of the holder I, is wound spiral fashion and inserted in one of the cup-shaped members. A shaft equipped with a knurled hand wheel 6 is mounted to rotate in this member, and the inner end of the strip 8 is inserted in a notch in the shaft. The two cups are then assembled by turning them about the hinge 3, and the outer end of the strip 8 now issues from the tubular end of the extension 2 which is slotted at 4. A tapered sleeve 5 is placed on the slotted end of the extension 2 for clamping the outer end of the strip 8 therein.

In operation, when the end of the strip 8 which projects from the tubular slotted end of the extension 2, has become worn, the sleeve 5 is removed, the handle 6 is turned for pushing the outer end of the strip further out of the tubular end, and the sleeve is then replaced.

This construction, with the knurled handle 6, is somewhat elaborate and comparatively expensive. If low cost is the first consideration, the hand wheel 6 may be dispensed with. In this case, it is necessary to open the handle. The sleeve 5 is removed, the handle is opened by turning its members about the hinge 3 in outward direction, the strip 8 is pulled out as far as required, the handle is closed and the sleeve 5 is replaced on the slotted end of the extension 2.

Figure 3:
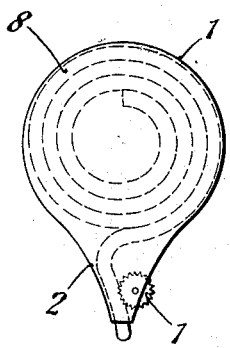
Fig. 3 is a side elevation of an eraser whose rubber strip is also wound spiral fashion in the handle, with a pinion or knurled disk engaging the strip near its outer end for feeding it.

Referring now to Fig. 3, the two cup-shaped members of this holder are permanently connected by pasting them together and the rubber strip 8 is fed by a pinion, or knurled disk, 7 which is mounted to rotate in the extension 2 near its end, and partly projects from its side.

The elasticity of the rubber strip 8 can be utilized for feeding it. If this is desired the rubber strip 8 is folded zig-zag fashion before being inserted in the handle I so that its reaction tends to push the outer end of the rubber strip 8 out of the tubular end of the extension 2.

Figure 4:
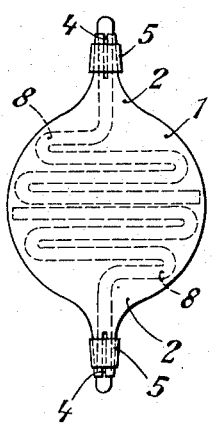
Fig. 4 is a side elevation of an eraser whose handle receives two rubber strips folded zig-zag fashion.

This idea is embodied in the eraser illustrated in Fig. 4. In this case, the hollow handle I houses two strips of rubber, 8 and 8', the strip 8 being, for instance, an ink eraser, and the strip 8' being an eraser for lead pencil. The extension 2 is provided for the strip 8 as described, with its slotted tubular end and the sleeve 5, but in addition an exactly similar extension 2' is provided for the rubber strip 8'.

If it is desired to feed the end of one of the strips the corresponding sleeve 5 is removed and the outer end of the strip then issues by its own elasticity. It will appear that the manipulation of this eraser compares favorably with that of the erasers illustrated in Figs. 1 and 2, and in Fig. 3, for, while in Figs. 1 and 2 it is necessary to remove the sleeve 5 and to turn the hand wheel 6, or, if this hand wheel is dispensed with, to open the handle 1, and in Fig. 3 the pinion or knurled wheel 7 must be rotated, all that is required in Fig. 4 is to remove, or to withdraw slightly, the corresponding sleeve 5 and to replace, or reset, the sleeve 5 when the outer end of the strip has come out for a sufficient length.

It is understood that, with respect to the zigzag arrangement illustrated in Fig. 4, I am not limited to a handle 1 having two extensions 2 and 2', as shown in Fig. 4, but that I may arrange the strip zig-zag fashion in a device as illustrated in Figs. 1 and 2, obviously without the hand wheel 6.

I claim:

1. An eraser comprising a hollow handle of inexpensive material, defining an aperture, and a rubber strip wound spiral fashion in the handle whose length is a multiple of the largest inside dimension of the handle and whose outer end projects from the aperture.

2. An eraser comprising a hollow handle of inexpensive material defining an aperture, and a rubber strip folded zig-zag fashion in the handle whose length is a multiple of the largest inside dimension of the handle and whose outer end projects from the aperture.

3. An eraser comprising a hollow handle of inexpensive material, defining an aperture, a rubber strip in the handle whose length is a multiple of the largest inside dimension of the handle and whose outer end projects from the aperture, and means for varying the length of the projecting end.

4. An eraser comprising a hollow handle of inexpensive material, defining an aperture, a rubber strip in the handle whose length is a multiple of the largest inside dimension of the handle and whose outer end projects from the aperture and means for clamping the strip in the aperture.

5. An eraser comprising a hollow handle of inexpensive material, defining an aperture, a rubber strip in the handle whose length is a multiple of the largest inside dimension of the handle and whose outer end projects from the aperture, and means for feeding the strip through the aperture.

6. An eraser comprising a hollow handle of inexpensive material, defining an aperture, a rubber strip in the handle whose length is a multiple of the largest inside dimension of the handle and whose outer end projects from the aperture, the strip being so inserted in the handle that its elastic reaction tends to push the outer end of the strip out of the aperture, and means for retaining the strip in the aperture.

7. An eraser comprising two cup-shaped members of inexpensive material making up together a hollow handle defining an aperture, a rubber strip in the handle whose length is a multiple of the largest inside dimension of the handle and whose outer end projects from the aperture, and a tapered sleeve for clamping the strip in the aperture.

8. An eraser comprising two cup-shaped members of inexpensive material, a hinge connecting the members, said members being arranged to make up together a hollow handle defining an aperture, a rubber strip in the handle whose length is a multiple of the largest inside dimension of the handle and whose outer end projects from the aperture, and a tapered sleeve for uniting the members and clamping the strip in the aperture.

9. An eraser comprising two cup-shaped members of inexpensive material making up together a hollow handle defining an aperture, a rubber strip in the handle whose length is a multiple of the largest inside dimension of the handle and whose outer end projects from the aperture, and a rotary member for feeding the strip through the aperture.

10. An eraser comprising a hollow handle defining an aperture, and a rubber strip in the handle whose length is a multiple of the largest inside dimension of the handle and whose outer end projects from the aperture.

ERNST RÜDIGER.